Nov. 5, 1957    L. F. FULHAM    2,812,412
MANUALLY TURNABLE WHEELS
Filed March 12, 1956
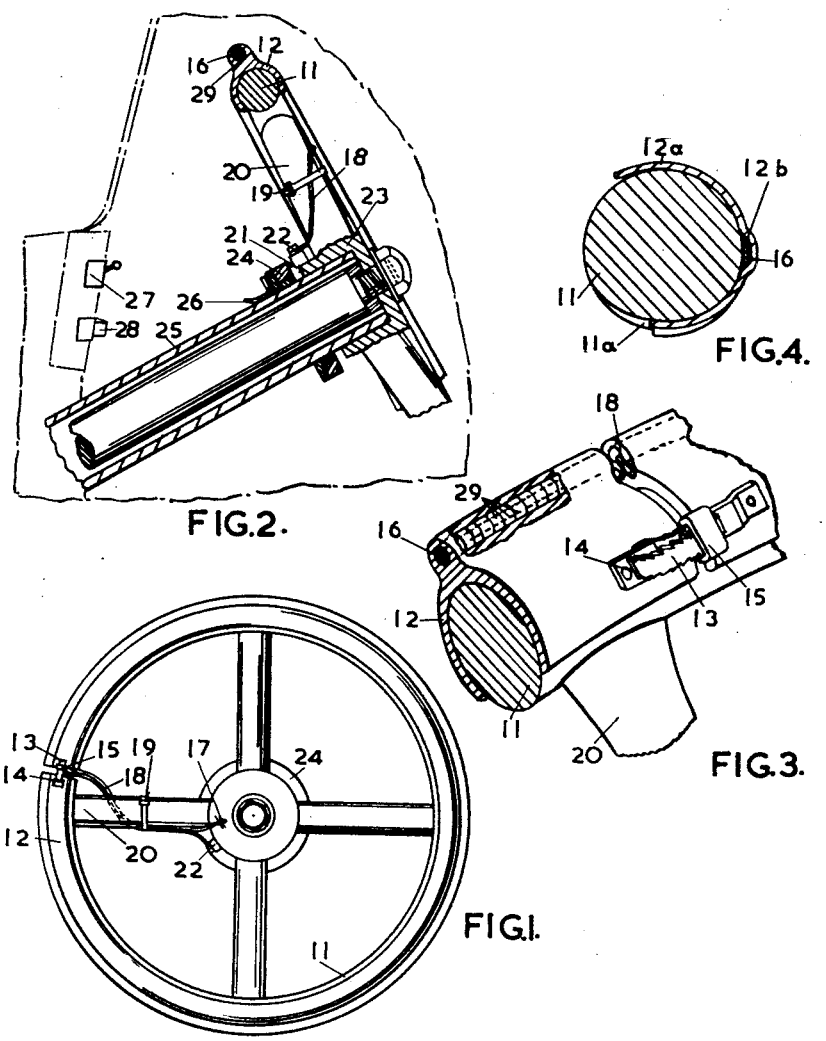

United States Patent Office 2,812,412
Patented Nov. 5, 1957

2,812,412
MANUALLY TURNABLE WHEELS
Lawrence F. Fulham, Kenilworth, England
Application March 12, 1956, Serial No. 571,014
Claims priority, application Great Britain March 16, 1955
3 Claims. (Cl. 219—19)

The invention relates to manually turnable wheels (e. g., of industrial or agricultural machines, or of vehicles) and its object is to increase the comfort of the operator by desirably heating the wheel, and consequently to reduce the risk of danger due to chilling of the operator's hands, particularly in instances where the wheel has to be turned with such delicacy that the wearing of gloves is undesirable.

A further object is to provide the steering wheel of a vehicle internally with means for heating it, while yet another object is to provide an orthodox steering wheel for a vehicle with a separately applicable means for providing it with a heated surface to be gripped by an operator.

According to a further object means is provided whereby the degree of heating of the wheel can be adjusted.

The wheel can be heated in any suitable manner (e. g., by water derived from the engine cooling system), but one example of an electrically heated steering wheel is described with reference to the drawings, in which latter:

Figure 1 is a plan view of an automobile steering wheel fitted with an adaptor according to the invention;

Figure 2 is a radial section through part of the wheel of Figure 1 and adjacent structure;

Figure 3 is a perspective view, to a larger scale, of a portion of the wheel and adaptor in the region of a joint in the latter; and Figure 4 is a cross-section illustrating a modified form of the adaptor.

In the construction shown in Figures 1 to 3 the ring 11 of a normal steering wheel is resiliently embraced by an adaptor in the form of an open-sided, hoop-like sleeve 12 which can be formed from mesh-spun aluminum or any other suitable material (e. g., a resilient plastic). The sleeve is discontinuous so as to enable it to be placed in position over the ring, and its ends are united by a serrated rubber tongue 13 on one of them engaged with an eyelet 14 on the other and bent back after the said ends have been drawn together for applying a desirable tension circumferentially of the sleeve. A flat ring 15 can afterwards be slid over the joint to secure, and obscure it.

The sleeve, which can be made sufficiently ductile to be easily deformed into existing hand-grip depressions 11a of the ring 11, is internally formed with a channel in which is housed an insulated electric resistance heating element 16, of which one end is earthed as indicated at 17. The other end of this element is connected to an insulated lead 18 which is held (e. g., by clips 19) to a spoke 20 of the steering wheel and is conductively connected to a brush 21 in a holder 22 secured to the nave 23 of the steering wheel. A slip-ring 24 fast with the stationary steering column 25 has an insulated lead 26 connected to be supplied by an electric battery (not shown), for example, the general services battery of the vehicle. This circuit can include an "on/off" switch 27 situated on the facia panel of the vehicle, and it can also include an adjustable rheostat 28, in a similar position, for varying the amount of heat generated by the element. The latter is shown strung through a series of non-conductive beads 29 for insulating it from the sleeve, (which in this case is conductive), but it could be insulated therefrom in any other suitable manner (e. g., by an insulating cement which also holds it in position in the channel of the sleeve).

Figure 4 shows a sleeve 12a formed from flat material to have a channel on the inside in which the element 16 is laid and secured in position by a strip 12b of material adhered to the inner surface of the sleeve. If desired, the element can be embedded in the adhesive (which, of course, will be insulating in character) instead of being strung with beads like 29.

Obviously hand wheels of agricultural machines, machine tools, marine craft, etc., could be heated in accordance with the invention; and in the case where that is to be done by water from the engine cooling system the heating element for the wheel, or adaptor can be a copper pipe, arranged in the same way as the element 16, connected to receive a constant circulation. In that case there would be universally-jointed connections between the supply and return pipes on the steering column on the one hand, and pipes fast with a spoke of the wheel for feeding the element on the other hand. Also, of course, a stop valve would be used in place of the switch 27, and a variable restrictor in place of the rheostat 28.

What I claim as my invention and desire to secure by Letters Patent of the United States is:

1. A steering wheel heater comprising an open-sided discontinuous sleeve, the open side of the sleeve being adapted to engage over a peripheral ring of a steering wheel, means being provided for interconnecting the ends of the sleeve for contracting the sleeve on to the ring, and an electric heating element being accommodated adjacent the internal periphery of the sleeve, the element being in a channel extending from one end of the sleeve to the other end.

2. A steering wheel heater according to claim 1 and including a supply lead for said element made externally fast to a spoke of said steering wheel and extending towards a nave of the latter, a bush housing supported by said steering wheel adjacent the centre thereof, a brush guided in said housing and connected to said supply lead, and a slip ring for coaction with said brush coaxially fast with stationary structure from which said steering wheel is journalled, the slip ring being adapted for connection by a stationary lead to a source of supply.

3. A steering wheel heater comprising an open-sided discontinuous sleeve, the open side of the sleeve being adapted to engage over a peripheral ring of a steering wheel, means being provided for interconnecting the ends of the sleeve for contracting the sleeve on to the ring, and an electric heating element being accommodated adjacent the internal periphery of the sleeve, the element being in a channel extending from one end of the sleeve to the other end, and including a supply lead for said element made externally fast to a spoke of said steering wheel and extending towards a nave of the latter, a bush housing supported by said steering wheel adjacent the centre thereof, a brush guided in said housing and connected to said supply lead, and a slip ring for coaction with said brush coaxially fast with stationary structure from which said steering wheel is journalled, the slip ring being adapted for connection by a stationary lead to a source of supply, and the supply lead including a switch for controlling a supply of current to the heater element, the stationary supply lead additionally including a thermostat element for controlling the heat generated by the heater element.

References Cited in the file of this patent

UNITED STATES PATENTS

| | | |
|---|---|---|
| 1,260,328 | Chase | Mar. 26, 1918 |
| 1,366,554 | Blackburn | Jan. 25, 1921 |
| 2,392,539 | Leible | Jan. 8, 1946 |
| 2,652,476 | Di Langiano | Sept. 15, 1953 |

FOREIGN PATENTS

| | | |
|---|---|---|
| 425,360 | Great Britain | Mar. 4, 1935 |